US012680253B2

(12) United States Patent
Plotkin et al.

(10) Patent No.: US 12,680,253 B2
(45) Date of Patent: Jul. 14, 2026

(54) PILING SUPPORT ARRANGEMENT

(71) Applicant: Spinex Systems Inc., Aiken, SC (US)

(72) Inventors: Kym Anthony Plotkin, Ormeau (AU); Alexander W. Au, Aiken, SC (US)

(73) Assignee: Spinex Systems Inc., Aiken, SC (US)

( * ) Notice: Subject to any disclaimer, the term of this patent is extended or adjusted under 35 U.S.C. 154(b) by 58 days.

(21) Appl. No.: 18/700,941

(22) PCT Filed: Oct. 14, 2022

(86) PCT No.: PCT/AU2022/051233
§ 371 (c)(1),
(2) Date: Apr. 12, 2024

(87) PCT Pub. No.: WO2023/060314
PCT Pub. Date: Apr. 20, 2023

(65) Prior Publication Data
US 2025/0003169 A1 Jan. 2, 2025

Related U.S. Application Data

(60) Provisional application No. 63/256,162, filed on Oct. 15, 2021.

(51) Int. Cl.
| | |
|---|---|
| *E02D 5/56* | (2006.01) |
| *E02D 5/54* | (2006.01) |
| *H02S 20/32* | (2014.01) |

(52) U.S. Cl.
CPC .................. *E02D 5/56* (2013.01); *E02D 5/54* (2013.01); *H02S 20/32* (2014.12)

(58) Field of Classification Search
CPC .............. E02D 5/56; E02D 5/54; H02S 20/32
See application file for complete search history.

(56) References Cited

U.S. PATENT DOCUMENTS

| | | | |
|---|---|---|---|
| 2020/0076354 A1 | 3/2020 | West et al. | |
| 2020/0076355 A1* | 3/2020 | Hudson ................... | F24S 25/70 |
| 2020/0116394 A1 | 4/2020 | West et al. | |
| 2021/0124007 A1 | 4/2021 | Pesce et al. | |
| 2021/0140134 A1 | 5/2021 | Kraft et al. | |
| 2021/0175840 A1 | 6/2021 | Hudson et al. | |
| 2021/0257964 A1 | 8/2021 | Hudson et al. | |
| 2021/0273603 A1* | 9/2021 | Almy ................... | F24S 25/617 |

FOREIGN PATENT DOCUMENTS

| | | |
|---|---|---|
| AU | 2011100820 A4 | 8/2011 |
| DE | 202016103981 U1 | 8/2016 |

OTHER PUBLICATIONS

European Patent Office, "Extended European Search Report", From Application No. 22879692.6, Dated Jul. 18, 2025, pp. 10.
International Search Report and Written Opinion for Int. App. No. PCT/AU2022/051233, mailed Dec. 9, 2022.

* cited by examiner

*Primary Examiner* — Kyle Armstrong
(74) *Attorney, Agent, or Firm* — Fredrikson & Byron, P.A.

(57) ABSTRACT

A support for use with a solar tracker includes two screw piles or blade piles (41, 42) inserted into the ground at an angle to vertical, wherein top portions of the two screw piles or blade piles (41, 42) are positioned close to each other, and a connector (46) connecting the top portions of the two screw piles or blade piles to each other, the connector carrying or forming a solar tracker support.

23 Claims, 14 Drawing Sheets

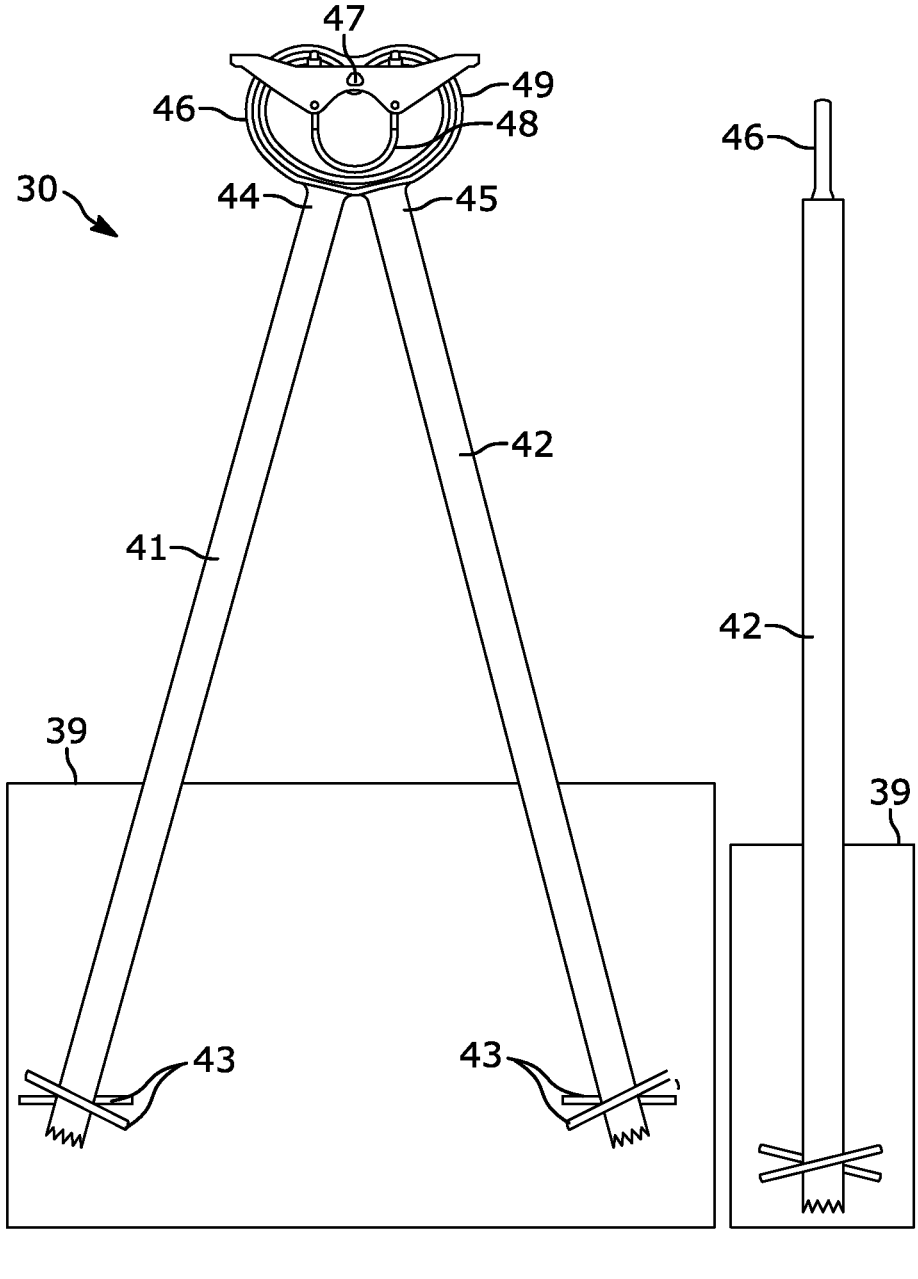
FIG. 3        FIG. 4

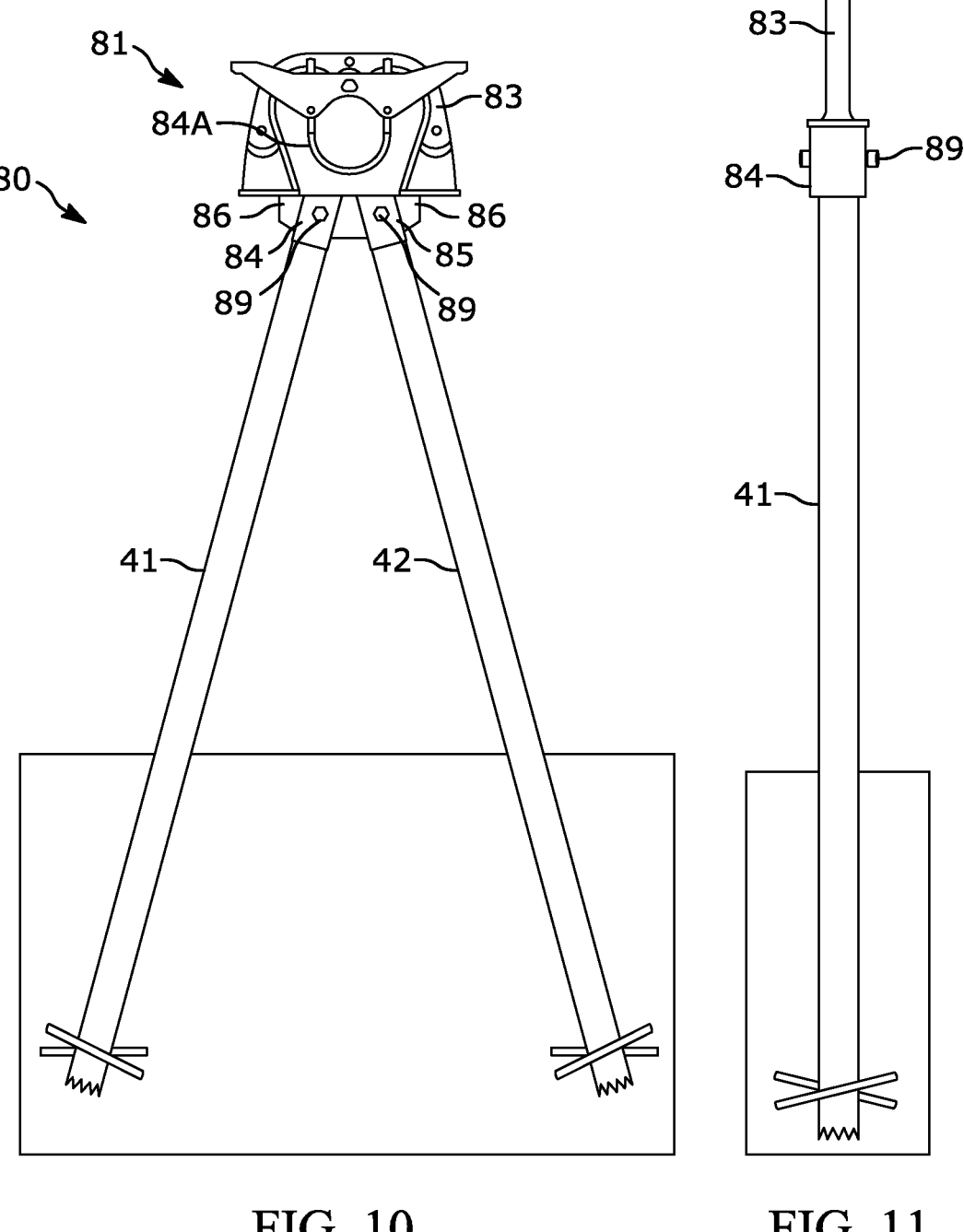
FIG. 10          FIG. 11

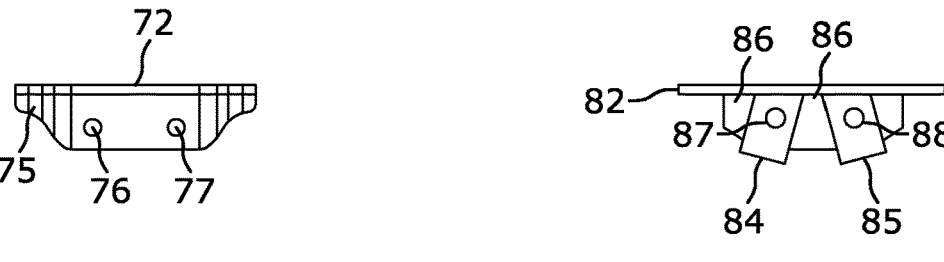
FIG. 12                 FIG. 13
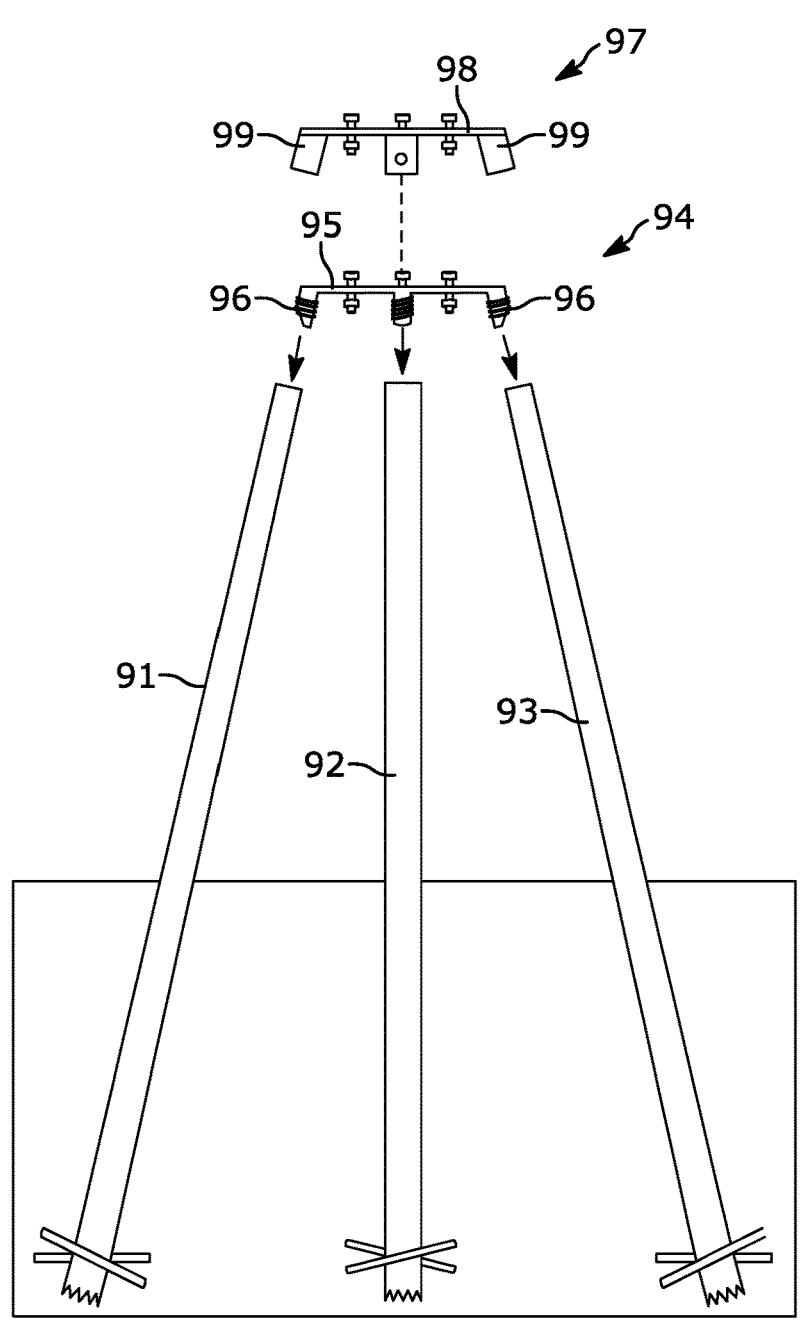
FIG. 14

326

336

PILING SUPPORT ARRANGEMENT

CROSS-REFERENCE TO RELATED APPLICATIONS

The present application is a U.S. National Phase Application pursuant to 35 U.S.C. § 371 of International Application No. PCT/AU2022/051233 filed Oct. 14, 2022, which claims priority to U.S. Provisional Patent Application No. 63/256,162 filed Oct. 15, 2021. The entire disclosure contents of these applications are herewith incorporated by reference into the present application.

TECHNICAL FIELD

The present invention relates to a piling support arrangement for a solar tracker and to a solar tracker support arrangement.

BACKGROUND ART

Many large-scale solar farms utilise solar trackers so that the photovoltaic solar panels move during the day to remain more closely aligned with the position of the sun. This increases electricity production from the solar panels.

Solar trackers in large-scale solar farms typically comprise an array of solar panels or a series of solar panels mounted to a long torque tube or a series of torque tubes that are in alignment with each other. A drive motor rotates the torque tube(s), which, of course, causes the solar panels to rotate with the torque tube to closely follow the sun as the sun moves across the sky during the day. The torque tube is normally supported on or suspended from a number of spaced support members and it is necessary to accurately position the support members in order to ensure that the torque tube is in alignment and that rotation of the torque tube can occur.

There are a variety of piles that have been utilized for the support of solar trackers, particularly single axis solar trackers. In some instances, I or H-beams are employed, and these beams are driven into the ground to a desired depth. An example of such a beam can be seen in FIG. 1. After installation of the beams in the earth, a bearing assembly is connected thereto with a variety of bolts. The beam and the bearing typically include some means of adjusting the bearing relative to the beam to allow misalignments to be corrected.

In other instances, screw piles have been devised that with the use of special screw machinery can be screwed into the earth to a desired depth. These screw piles typically employ a helical screw thread that wraps around a portion of the centre post of the pile.

While both traditional I or H-beam piles and screw piles are generally they do create challenges for the industry. For I or H-beam piles there is quite a bit of effort and labour expended on proper installation and then subsequent mounting and alignment of the bearings. For screw piles alignment can also be a challenge, particularly where two or more screw piles are employed to support a single bearing. Each of these must be aligned with each other, and then with the remaining piles of the solar tracker. Moreover, the bearing still needs to be fitted and aligned with other bearings in the solar tracker.

One of the present inventors devised a support being system and structure for supporting solar trackers and intended for use in a solar farm that was being developed in Moree in the Australian state of New South Wales in 2014.

FIG. 1 shows a schematic view of this proposal. The solar tracker system shown in FIG. 1 has a torque tube 10 passing through and supported by bearings 11. A plurality of spaced supports are provided to support the bearings 11 and, in turn, the torque tube 10. A central support 12 comprises four screw piles or blade piles 13, 14, 15, 16. The central support 12 supports the motor that drives the torque tube. The blade piles are available from Blade Pile Pty Ltd and may be as described in Australian innovation US2011100820. The screw piles or blade piles 13, 14, 15, 16 are inserted or drilled into the ground at an angle to vertical. A top plate 17 is mounted to the top of each of the screw piles 13, 14, 15, 16. The top plate 17 acts to tie the tops of the screw piles 13, 14, 15, 16 together and also provides a mounting surface for an upright 18 that carries motor 19.

A number of other supports are also provided to support the torque tube. These other supports are spaced from each other and are essentially identical. The other supports, one of which is shown at 20, includes a first blade pile 21 screwed into the ground at an angle to vertical and a second blade pile 22 screwed into the ground at an angle to vertical. The tops of the blade piles 21, 22 are spaced very close to each other or even in abutment with each other. A top gusset plate 23 is connected to the tops of the blade piles 21, 22. An upright 24 holds the bearing 11 which, in turn, receives the beam 10. Thus, support structure 20 forms an A-frame structure that resists bending in a direction transverse to the longitudinal axis of the beam 10, which is very desirable in solar trackers, as wind forces on the solar panels tend to produce strong forces transverse to the longitudinal axis of the tracker.

It will be clearly understood that, if a prior art publication is referred to herein, this reference does not constitute an admission that the publication forms part of the common general knowledge in the art in Australia or in any other country.

SUMMARY OF INVENTION

The present invention is directed to a support system for solar trackers, which may at least partially overcome at least one of the abovementioned disadvantages or provide the consumer with a useful or commercial choice.

In a first aspect, the present invention provides a support system for a solar tracker including a plurality of supports spaced from each other and extending along the longitudinal axis of the solar tracker, the supports including two screw piles or blade piles inserted into the ground at an angle to vertical, wherein top portions of the two screw piles or blade piles are positioned close to each other, and a connector connecting the top portions of the two screw piles or blade piles to each other, the connector carrying or forming a solar tracker support.

In a second aspect, the present invention provides a support for use with a solar tracker, the support including two screw piles or blade piles inserted into the ground at an angle to vertical, wherein top portions of the two screw piles or blade piles are positioned close to each other, and a connector connecting the top portions of the two screw piles or blade piles to each other, the connector carrying or forming a solar tracker support.

In one embodiment, the two screw piles or blade piles comprise unitary screw piles or unitary blade piles.

In one embodiment, a first screw pile or blade pile is screwed into the ground at an angle to vertical and a second screw pile or blade pile is screwed into the ground at an angle to vertical, with the first screw pile or blade pile angling inwardly towards a longitudinal axis of the solar tracker and the second screw pile or blade pile angling inwardly towards a longitudinal axis of the solar tracker.

In one embodiment, the connector comprises a hoop or a loop of material, the hoop or loop carrying a bearing that can receive or support a solar tracker or receive or support a pin for carrying a solar tracker. In one embodiment, the hoop or loop of material is forged. This allows for a strong loop of material to be obtained at a minimum material thickness or material weight.

In one embodiment, the connector comprises a first leg extending at an angle to vertical, the first leg being received within an upper portion of the first screw pile or blade pile, and a second leg extending at an angle to vertical, the second leg being received within an upper portion of the second screw pile or blade pile. In this embodiment, the first leg may be crimped or bolted or affixed by other fasteners to the first screw pile or blade pile and the connector may be crimped or bolted or affixed by other fasteners to the second screw pile or blade pile.

In one embodiment, the first leg of the connector has a lower region that tapers inwardly or the first leg has an outer part of a lower region removed therefrom, or the first leg has an outer part of a lower region having reduced cross-sectional area at an outer region thereof and the second leg has a lower region that tapers inwardly or the second leg has an outer part of a lower region removed therefrom, or the second leg has an outer part of a lower region having reduced cross-sectional area at an outer region thereof. In this embodiment, insertion of the angled first leg and second leg of the connector into the top portions of the respective first and second screw piles or blade piles is facilitated by the tapering lower region or the lower region that has an outer part removed therefrom or the outer part of the lower region having reduced cross-sectional area at an outer region thereof.

In one embodiment, the first leg and the second leg of the connector have one or more ribs thereon, or the first leg and the second leg have alternating regions of larger diameter or cross-sectional area and smaller diameter or cross-sectional area, with shoulders located therebetween. In these embodiments, affixing of the connector to the first and second screw piles or blade piles by crimping is enhanced by the ribs or alternating regions of larger diameter/area and smaller diameter/area. It will also be appreciated, that fasteners, such as bolts, screw or rivets, can be used to connect the legs of the connector to the upper parts of the first and second screw piles or blade piles.

In one embodiment, the connector comprises a solar tracker support, a base portion connected to or formed with the solar tracker support, and two opposed ears or plates extending downwardly from the base portion, a first ear or plate located to one side of a top portion of the first and second screw piles or blade piles, a second ear or plate located to another side of a top portion of the first and second screw piles or blade piles, and fasteners extending through the first ear or plate and the second ear or plate to affix the top portion of the first screw pile or blade pile to the first ear or plate and to the second ear or plate and to affix the top portion of the second screw pile or blade pile to the first ear or plate and to the second ear or plate. In one embodiment, the fasteners comprise bolts and nuts. In another embodiment, the fasteners comprise screws. In another embodiment, the fasteners comprise rivets. In one embodiment, the first ear or plate and the second ear or plate may be provided with aligned openings for receiving one or more fasteners. The aligned openings may be positioned in alignment with one or more openings formed in the top portions of the first screw pile or blade pile and the second screw pile or blade pile.

In one embodiment, the connector comprises a solar tracker support, a first sleeve extending downwardly at an angle, a second sleeve extending downwardly at an angle, the first sleeve extending over a top portion of the first screw pile or blade pile, the second sleeve extending over a top portion of the second screw pile or blade pile, and fasteners for connecting the first sleeve to the first screw pile and for connecting the second sleeve to the second screw pile. In one embodiment, the solar tracker support comprises a base portion with the first sleeve extending downwardly at an angle from the base portion and the second sleeve extending downwardly at an angle from the base portion. The base portion may comprise a base plate. One or more reinforcing gussets or reinforcing plates may also be provided. The first sleeve and the second sleeve may be provided with aligned openings for receiving fasteners that also pass through openings formed in the top portion of the first and second screw piles or blade piles. In one embodiment, the fasteners comprise bolts and nuts. In another embodiment, the fasteners comprise screws. In another embodiment, the fasteners comprise rivets.

In one embodiment, the connector carries a bracket, the bracket adapted to carry a torque tube mounting arrangement. In one embodiment, the bracket is fastened to the connector and a torque tube mounting arrangement is suspended from a pin or fastener passing through the bracket.

In another embodiment, the connector carries or includes a mounting means for a torque tube mounting arrangement. The mounting means may comprise a hole or an opening. The hole or opening may be formed in the connector or the hole or opening may be formed in a tab or plate attached to the connector. The tab or plate may be welded to the connector.

In another embodiment, the connector is adapted to carry a torque tube mounting arrangement. In one embodiment, the connector includes receiving means for receiving a torque tube swing arm pin. In one embodiment, the connector includes spaced and aligned apertures to receive a torque tube swing arm pin. In one embodiment, the apertures may be provided with bushes, such as nylon bushes, or bearings, to reduce friction between the connector and the torque tube mounting arrangement, or between the connector and the torque tube swing arm pin.

In one embodiment, the screw piles or blade piles comprise a hollow tube having one or more screws or blades affixed thereto. The screw piles or blade piles may include internal drive hubs that receive a drive tool or driveshaft to facilitate installation of the screw piles or blade piles into the ground. Pile lengths, screw sizes, blade sizes and steel thickness will be governed by the given site-specific geotechnical environment and specified loads, as will be understood by persons skilled in the art. In one embodiment, the piles comprise blade piles available from Blade Pile Pty Ltd.

The piles will suitably be made from metal, such as heavy duty metal, such as steel. The steel may be galvanised or rust proofed. The supports are suitably made from metal, such as steel. The steel may be galvanised or rust proofed.

In one embodiment of the present invention, the support system for the solar tracker may comprise a motor support, the motor support including three or four piles inserted into the ground, upper ends of the three or four piles adapted to enable a motor drive for the torque tube to be mounted thereto.

In this embodiment, the three or four piles each extend at an angle to the vertical and extend inwardly towards the longitudinal axis of the solar tracker. The three or four piles also extend inwardly so that their upper portions are located close to each other.

In one embodiment, a connector is used to connect the upper ends of the three or four piles to each other. The connector may comprise a plate having three or four legs extending downwardly at an angle to vertical, the three of four legs being adapted for insertion into respective upper proportions of the three or four piles. In this embodiment, the legs may be crimped or bolted or affixed by other fasteners to the piles.

In one embodiment, each leg has a lower region that tapers inwardly or each leg has an outer part of a lower region removed therefrom, or the outer part of the lower region having reduced cross-sectional area at an outer region thereof. In this embodiment, insertion of the angled legs of the connector into the top portions of the respective piles is facilitated by the tapering lower region or the lower region that has an outer part removed therefrom.

In one embodiment, the legs have ribs thereon, or the legs have alternating regions of larger diameter or area and smaller diameter or area, with shoulders located therebetween. In these embodiments, affixing of the motor connector to the three or four piles by crimping is enhanced by the ribs or alternating regions of larger diameter and smaller diameter/area.

In one embodiment, the motor support comprises a base portion, three or four sleeves extending downwardly at an angle to vertical, the sleeves extending over a top portion of respective ones of the three or four piles, and fasteners for connecting the sleeves to the piles. The base portion may comprise a base plate. One or more reinforcing gussets or reinforcing plates may also be provided. The sleeves may be provided with aligned openings for receiving fasteners that also pass through openings formed in the top portion of the piles. In one embodiment, the fasteners comprise bolts and nuts. In another embodiment, the fasteners comprise screws. In another embodiment, the fasteners comprise rivets.

In a third aspect, the present invention provides a connector connecting the top portions of two screw piles or blade piles to each other, the two screw piles or blade piles being inserted into the ground at an angle to each other, the connector carrying or forming a solar tracker support, the connector comprising a first leg extending at an angle to vertical, the first leg being received within a portion of the first screw pile or blade pile, and a second leg extending at an angle to vertical, the second leg being received within a top portion of the first screw pile or blade pile. In this embodiment, the first leg may be crimped or bolted or affixed by other fasteners to the first screw pile or blade pile of the connector may be crimped or bolted or affixed by other fasteners to the second leg of the screw pile.

In one embodiment, the first leg has a lower region that tapers inwardly or the first leg has an outer part of a lower region removed therefrom or the first leg has an outer part of the lower region having reduced cross-sectional area at an outer region thereof, and the second leg has a lower region that tapers inwardly or the second leg has an outer part of a lower region removed therefrom, or the second leg has an outer part of the lower region having reduced cross-sectional area at an outer region thereof. In this embodiment, insertion of the angled first leg and second leg of the connector into the top portions of the respective first and second screw piles or blade piles is facilitated by the tapping lower region or the lower region that has an outer part removed therefrom.

In one embodiment, the first leg and the second leg have ribs thereon, or the first leg and the second leg have alternating regions of larger diameter or area and smaller diameter or area, with shoulders located therebetween. In these embodiments, affixing of the connector to the first and second screw piles or blade piles by crimping is enhanced by the ribs or alternating regions of larger diameter/area and smaller diameter/area.

In a fourth aspect, the present invention provides a connector for connecting the top portions of two screw piles or blade piles to each other, the two screw piles or blade piles being inserted into the ground at an angle to each other, the connector carrying or forming a solar tracker support, the connector comprising a solar tracker support, a base portion connected to or formed with the solar tracker support, and two opposed ears or plates extending downwardly from the base portion, a first ear or plate for locating to one side of a top portion of the first and second screw piles or blade piles, a second ear or plate for locating to another side of a top portion of the first and second screw piles or blade piles. Fasteners may be provided for extending through the first ear or plate and the second ear or plate to affix the top portion of the first screw pile or blade pile to the first ear or plate and to the second ear or plate and to affix the top portion of the second screw pile or blade pile to the first ear or plate and to the second ear or plate. In one embodiment, the fasteners comprise bolts and nuts. In another embodiment, the fasteners comprise screws. In another embodiment, the fasteners comprise rivets. In one embodiment, the first ear or plate and the second ear or plate may be provided with aligned openings for receiving one or more fasteners. The aligned openings may be positioned in alignment with one or more openings formed in the top portions of the first screw pile or blade pile and the second screw pile or blade pile.

In a fifth aspect, the present invention provides a connector for connecting the top portions of two screw piles or blade piles to each other, the two screw piles or blade piles being inserted into the ground at an angle to each other, the connector carrying or forming a solar tracker support, the connector comprising a solar tracker support, a first sleeve extending downwardly at an angle, a second sleeve extending downwardly at an angle, the first sleeve extending over a top portion of the first screw pile or blade pile, the second sleeve extending over a top portion of the second screw pile or blade pile. Fasteners may be provided for connecting the first sleeve to the first screw pile and for connecting the second sleeve to the second screw pile. In one embodiment, the solar tracker support comprises a base portion with the first sleeve extending downwardly at an angle from the base portion and the second sleeve extending downwardly at an angle from the base portion. The base portion may comprise a base plate. One or more reinforcing gussets or reinforcing plates may also be provided. The first sleeve and the second sleeve may be provided with aligned openings for receiving fasteners that also pass through openings formed in the top portion of the first and second screw piles or blade piles. In one embodiment, the fasteners comprise bolts and nuts. In another embodiment, the fasteners comprise screws. In another embodiment, the fasteners comprise rivets.

In one embodiment, the connector comprises a solar tracker support, a base portion connected to or formed with the solar tracker support, and two opposed ears or plates extending downwardly from the base portion, a first ear or plate located to one side of a top portion of the first and second screw piles or blade piles, a second ear or plate located to another side of a top portion of the first and second screw piles or blade piles, and fasteners extending through the first ear or plate and the second ear or plate to affix the top portion of the first screw pile or blade pile to the first ear or plate and to the second ear or plate and to affix the top portion of the second screw pile or blade pile to the first ear or plate and to the second ear or plate. In one embodiment, the fasteners comprise bolts and nuts. In another embodiment, the fasteners comprise screws. In another embodiment, the fasteners comprise rivets. In one embodiment, the first ear or plate and the second ear or plate may be provided with aligned openings for receiving one or more fasteners. The aligned openings may be positioned in alignment with one or more openings formed in the top portions of the first screw pile or blade pile and the second screw pile or blade pile.

In one embodiment, the connector comprises a solar tracker support, a first sleeve extending downwardly at an angle, a second sleeve extending downwardly at an angle, the first sleeve extending over a top portion of the first screw pile or blade pile, the second sleeve extending over a top portion of the second screw pile or blade pile, and fasteners for connecting the first sleeve to the first screw pile and for connecting the second sleeve to the second screw pile. In one embodiment, the solar tracker support comprises a base portion with the first sleeve extending downwardly at an angle from the base portion and the second sleeve extending downwardly at an angle from the base portion. The base portion may comprise a base plate. One or more reinforcing gussets or reinforcing plates may also be provided. The first sleeve and the second sleeve may be provided with aligned openings for receiving fasteners that also pass through openings formed in the top portion of the first and second screw piles or blade piles. In one embodiment, the fasteners comprise bolts and nuts. In another embodiment, the fasteners comprise screws. In another embodiment, the fasteners comprise rivets.

In one embodiment, the connector carries a bracket, the bracket adapted to carry a torque tube mounting arrangement. In one embodiment, the bracket is fastened to the connector and a torque tube mounting arrangement is suspended from a pin or fastener passing through the bracket.

In another embodiment, the connector carries or includes a mounting means for a torque tube mounting arrangement. The mounting means may comprise a hole or an opening. The hole or opening may be formed in the connector or the hole or opening may be formed in a tab or plate attached to the connector. The tab or plate may be welded to the connector.

In another embodiment, the connector is adapted to carry a torque tube mounting arrangement. In one embodiment, the connector includes receiving means for receiving a torque tube swing arm pin. In one embodiment, the connector includes spaced and aligned apertures to receive a torque tube swing arm pin. In one embodiment, the apertures may be provided with bushes, such as nylon bushes, or bearings, to reduce friction between the connector and the torque tube mounting arrangement, or between the connector and the torque tube swing arm pin.

In another aspect, the present invention provides a blade pile comprising a hollow shaft, a first blade mounted near a lower end of the hollow shaft and a second blade mounted at near the lower end of the hollow shaft, the first blade having a plurality of tabs extending through respective openings in a side wall of the hollow shaft, the second blade having a plurality of tabs extending through respective openings in a side wall of the hollow shaft, the first blade and the second blade being affixed to the hollow shaft.

In one embodiment, the first blade has two tabs and the second blade has two tabs.

In one embodiment, the first blade comprises a plate and the second blade comprises a plate. In one embodiment, the first blade and the second blade have a recessed region or cut out region that is complimentary in shape to an outer surface of the hollow shaft, with the plurality of tabs being located in or adjacent to the recessed region or cut out region.

In one embodiment, the hollow shaft comprises a generally cylindrical hollow shaft.

In one embodiment, the first blade and the second blade are welded to the hollow shaft to affix the first blade and the second blade to the hollow shaft.

In one embodiment, the lower end of the hollow shaft is shaped to sweep away rocks and soil as the blade pile is rotatably driven into the ground.

In the completed shaft, the plurality of tabs on the first blade and the second blade extend into the interior volume of the hollow shaft. Accordingly, the tabs stand inwardly proud of the inner surface of the hollow shaft. Therefore, the tabs can provide engagement surfaces for a drive tool which is inserted into the hollow shaft to engage the tabs and to enable the blade pile to be driven into the ground. The drive tool will typically comprise an elongated shaft having a splined lower region, whereby recesses in the splined lower region are of complementary shape to the tabs extending into the hollow shaft so that recesses in the splined lower region of the drive tool engage with the tabs.

In one embodiment, the drive tool has a lower end that is shaped as a bit to enable the drive tool to break rock as it is driven into the ground.

The blade piles of this aspect of the present invention can be used in the solar array support arrangement of other aspects of the present invention.

In another aspect, the pile may comprise a shaft having a through-ring affixed within a shaft of the pile, the through-ring being located at, near or adjacent to two opposed blades or plates, the through-ring having an opening to receive a drive tool and to be engaged by the drive tool.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 3 shows an end view, from a north-south perspective, of a support structure that comprises part of a larger support structure for a solar tracker, in accordance with an embodiment of the present invention. In FIG. 3, the blank space below ground level between the piles is merely an artefact of the drawing process and it does not represent any feature;

FIG. 4 shows a side view, from an east-west perspective, of the support structure shown in FIG. 3;

In FIG. 8, the blank space below ground level between the piles is merely an artefact of the drawing process and it does not represent any feature;

FIG. 10 shows an end view, from a north-south perspective, of a support structure that comprises part of a larger support structure for a solar tracker, in accordance with another embodiment of the present invention. In FIG. 10, the blank space below ground level between the piles is merely an artefact of the drawing process and it does not represent any feature;

FIG. 11 shows a side view, from an east-west perspective, of the support structure shown in FIG. 8;

FIG. 12 shows a side view of part of the connector used in the support structure shown in FIGS. 8 and 9;

FIG. 13 shows a side view of part of the connector used in the support structure shown in FIGS. 10 and 11;

FIG. 14 shows a side view of a support structure used to support a drive motor for the torque tube of the solar tracker, in accordance with one embodiment of the present invention. In FIG. 14, two alternative motor mounts are shown;

In FIG. 22, the shaft of the blade pile is shown in shadow so that internal details can be seen;

DESCRIPTION OF EMBODIMENTS

The skilled person will understand that the drawings have been provided for the purposes of describing preferred embodiments of the present invention. Therefore, it will be understood that the present invention should not be considered to be limited to the features as shown in the attached drawings.

Figure 1:
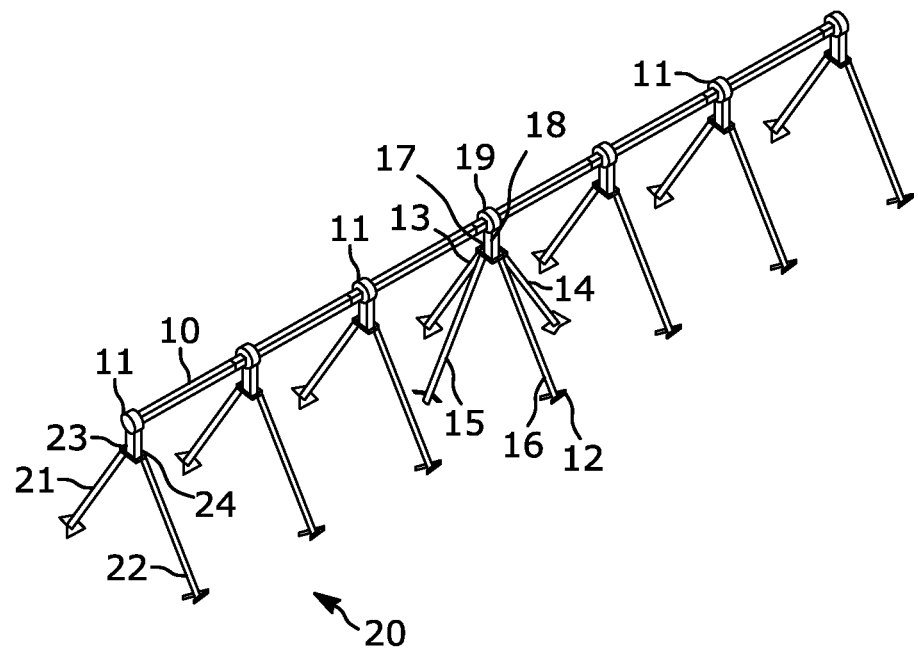
FIG. 1 shows a schematic diagram of a prior art support structure for a solar tracker.
Figure 2:
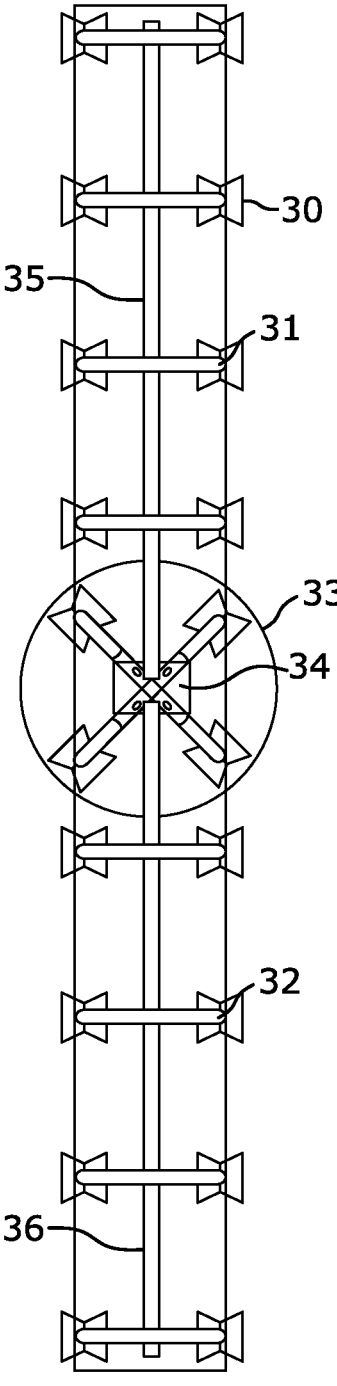
FIG. 2 shows a plan view of an installed support structure and torque tube for a solar tracker in accordance with an embodiment of the present invention.

FIG. 2 shows a plan view of an installed solar tracker/ solar array utilising a support structure in accordance with embodiments of the present invention. The support structure includes a plurality of aligned and spaced supports, some of which are numbered at 30, 31, 32. A motor support 33 is located towards the centre of the solar array shown in FIG. 20. The motor support 33 supports a motor 34. Torque tubes 35, 36 are connected to the motor and are supported by the aligned and spaced supports. A plurality of solar panels (not shown) are mounted to the torque tubes 35, 36 or are mounted to rotate with the torque tubes 35, 36. The motor 34 can drive the torque tubes 35, 36 so that the solar panels can be turned to follow the sun as the sun crosses the sky during the day. FIG. 2 shows a support structure that comprises a total of 8 supports and the motor support, although it will be appreciated that the number of supports can vary.

Figure 20:
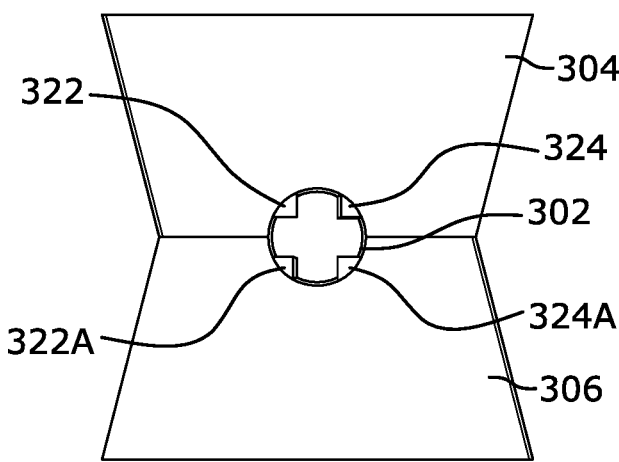
FIG. 20 shows an underneath view of the blade pile shown in FIG. 16.

To provide clarity to some of the nomenclature used in this specification, the "north-south direction" of the solar tracker and support structure shown in FIG. 20 corresponds to a direction that is parallel to the longitudinal axis of the torque tubes 35, 36. This does not necessarily require that the torque tubes 35, 36 extend along a north-south direction according to a compass. The "east-west direction" is the direction that extends perpendicularly to the longitudinal axis of the torque tubes 35, 36. Again, this does not imply that the "east-west direction" extends along an east or west line according to a compass. The skilled person will recognise that the solar panels included in the solar array shown in FIG. 2 typically result in force arising from wind load on the solar panels being applied much more strongly in an east-west direction than in a north-south direction. Accordingly, the support structure used to support the torque tube and the solar panels desirably provides greater resistance to force and movement for forces applied in an east-west direction, when compared to a north-south direction.

FIGS. 3 and 4 show a front view and a side view, respectively, of a support structure suitable for use in the solar tracker/solar array shown in FIG. 2, such as support structures 30, 31 and 32 of FIG. 2. As can be seen from FIG. 3, the support structure 30 comprises a first pile 41 and a second pile 42. Piles 41, 42 comprise blade piles and they have respective blades 43 mounted thereto. The blade piles are available from Blade Pile Pty Ltd and may be as described in Australian innovation US2011100820. It will also be understood that conventional screw piles may be used in embodiments of the present invention, if desired, although using blade piles provides several benefits.

Pile 41 is mounted into the ground on an angle to vertical. Ground level is shown at 39 in FIGS. 3 and 4. Pile 42 is also mounted into the ground at an angle to vertical, such that pile 41 and pile 42 slope inwardly towards each other and so that the upper portions 44, 45 of piles 41, 42 are located near each other. A connector 46, which will be described in further detail hereunder, is used to connect the upper portions of piles 41 and 42 together. This results in support 30 being in the form of an A-frame support. The connecter 46 carries a bearing pin 47 that, in turn, supports a hanger 48 for the torque tube (not shown). The connector 46 has a hoop or loop of material 49 through which the torque tube can pass in use.

Figure 5:
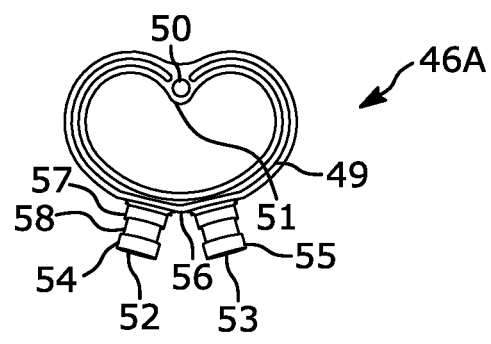
FIG. 5 shows a front view of a connector for use in the support structure shown in FIG. 3, in accordance with an embodiment of the present invention.

FIG. 5 shows a front view of a connector 46A that can be used in the embodiments shown in FIGS. 3 and 4. The connector 46A comprises a loop of material 49 that has an opening 50 therein to receive a bearing pin of a solar tracker hanger. The opening 50 is formed in a cusp region 51 of the loop of material 49.

The connector 46A has two legs 52, 53. As can be seen from FIG. 5, legs 52, 53 extend downwardly and outwardly from the loop of material 49. The legs 52, 53 extend at an angle to vertical that is essentially the same as the angle to vertical at which the piles 41, 42 are inserted into the ground. The legs 52, 53 are designed to be inserted into the upper open ends of the piles 41, 42 and the piles are then crimped to firmly affix the legs 52, 53, and hence the connector 46A, to the piles 41, 42. In order to facilitate fitment of the legs 52, 53 to the top of the piles, the lower outer regions 54, 55 are chamfered or bevelled or cut off in order to present a smaller cross-sectional area to the angled upper portions of the piles 41, 42. Alternatively, the lower part of the legs 52, 53, may taper inwardly to facilitate insertion of the lower part of the legs into the angled upper portions of the piles 41, 42. It will be appreciated that the juncture 56 between the legs 54 and 55 basically sets the upper parts of the legs 54, 55 to the distance at which the upper portions of the piles 41, 42 are spaced from each other once they have been inserted into the ground. However, the lower ends of the legs 52, 53 are spaced further apart than the tops of the piles 41, 42 when the piles are inserted into the ground. Therefore, it can be difficult to get the lower ends of the legs 52, 53 into the tops of the piles when first inserting the connector 46A into the piles. The chamfered, bevelled, cut off or tapered regions 54, 55 assist in this process. Once the ends of the legs 52, 53 have been inserted into the tops of the piles, the connector 46A can be hit downwardly with a hammer or downwardly pressed to fully fit the legs 52, 53 into the upper portions of the piles 41, 42. The upper parts of the piles can then be crimped to affix the connector to the piles.

As can also be seen from FIG. 5, leg 54 has a series of ribs 57, 58. The ribs 57, 58 may be formed by alternating regions of larger diameter and smaller diameter, with the transition between those regions forming shoulders or ribs. The shoulders or ribs allow the upper portions of the piles 41, 42 to be crimped to securely connect the upper portion of the piles 41, 42 to the legs 52, 53. Once the upper portion of the piles 41, 42 have been affixed to the legs 52, 53 of the connector 46A, the connector 46A firmly and rigidly connects the upper portion of pile 41 to the upper portion of pile 42.

The connector 46A may be in the form of an NXT BHA hoop, which is used to support torque tubes in Nextracker solar arrays. The loop of material may be formed from forged steel to provide maximum strength with minimum cross-sectional area of material.

Figure 6:
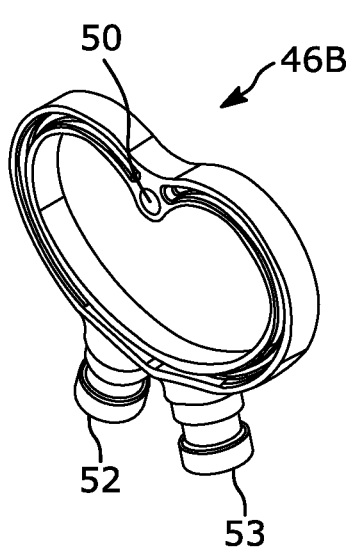
FIG. 6 shows a perspective view of another connector for use in the support structure shown in FIG. 3, in accordance with a further embodiment of the present invention.
Figure 7:
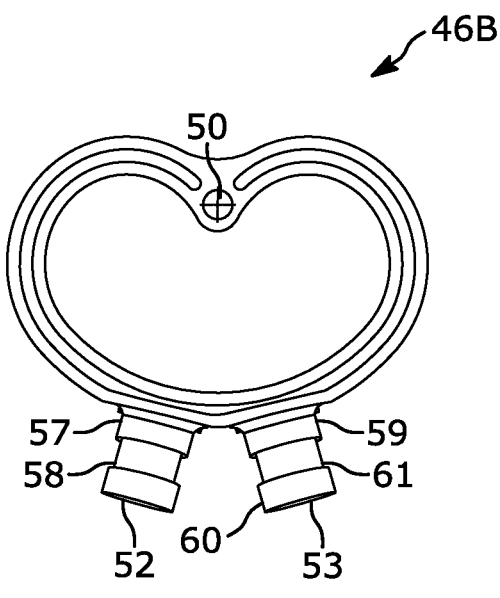
FIG. 7 shows a front view of the connector shown in FIG. 6.

FIGS. 6 and 7 show an alternative connector 46B. Connector 46B is very similar to the connector 46A shown in FIG. 5 and for brevity of description, like features will be denoted by like reference numerals. These features may not be described further. The difference between the connector 46B of FIGS. 6 and 7 and the connector 46A of FIG. 5 is that the legs 52, 53 of connector 46B do not have the chamfered, bevelled, cut off or tapered lower portions. The connector 46B can be fitted to the tops of the piles 41, 42 by flexing the tops of the piles 41, 42 sufficiently to enable insertion of the legs 52, 53 therein. The regions of larger diameter 59, 60 and the alternating region of smaller diameter 61 of leg 53 are also clearly shown in FIG. 7.

Figures 8, 9:
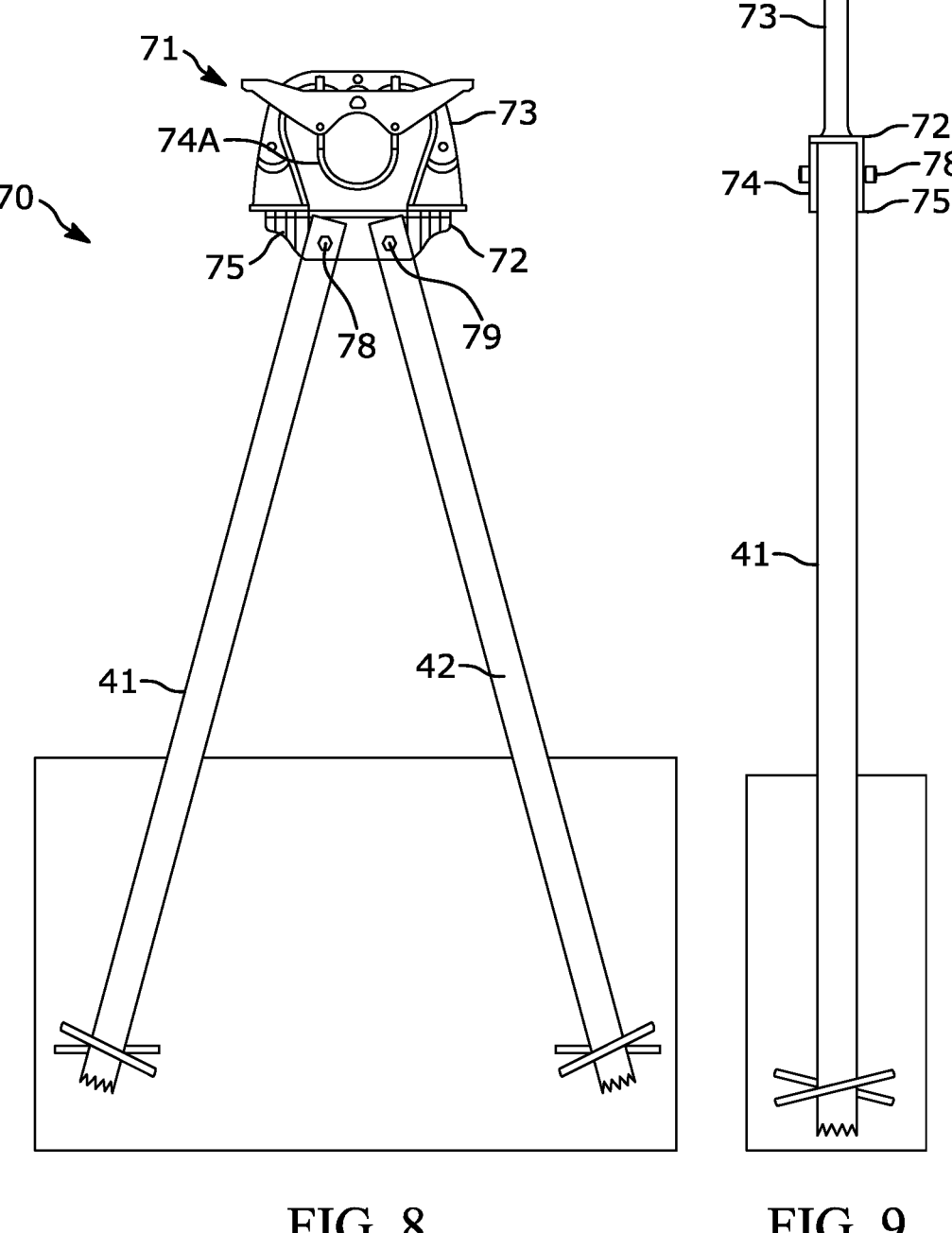
FIG. 8 shows an end view, from a north-south perspective, of a support structure that comprises part of a larger support structure for a solar tracker, in accordance with another embodiment of the present invention.
FIG. 9 shows a side view, from an east-west perspective, of the support structure shown in FIG. 8.

FIGS. 8, 9 and 12 show various views of another embodiment in accordance with the present invention. In FIGS. 8 and 9, a support 70 for a solar tracker array comprises two piles 41, 42 inserted into the ground at an angle to the vertical, in the same manner as described with reference to FIG. 3. The piles 41, 42 may be identical to the piles 41, 42 is shown in FIG. 3 and need not be described further. They are inserted into the ground in the same manner as described with reference to FIG. 3.

A connector 71 comprises a base plate 72 having a generally U-shaped loop 73 welded there too. The loop 73 carries a hanger 74A for a solar array torque tube, in a similar manner to that as described with reference to FIGS. 3 and 4. Opposed ears 74, 75 extend downwardly from the base plate 72. These are best shown in FIG. 9. The ears 74, 75 are opposed to each other and spaced from each other by distance equal to or just slightly greater than the diameter of the tubes that form the piles 41, 42.

In order to fit the connector 71 to the upper portion of the piles 41, 42, once the piles have been installed in the ground at the angle as shown in FIG. 8, the connector 71 is positioned such that the opposed ears 74, 75 are positioned on either side of the piles 41, 42, as shown in FIG. 9. As shown in FIG. 12, ear 75 has apertures 76, 77 formed therein and opposed ear 74 (not shown) has similar apertures that are aligned with apertures 76, 77. Similarly, the upper portion of the piles 41, 42 also have apertures formed therein, such as by drilling. The connector 71 is positioned such that the apertures 76, 77 in ear 75 and the aligned apertures in ear 74 come into alignment with the apertures in the upper portion of the piles 41, 42. Nuts and bolts 78, 79 are inserted through the aligned apertures and tightened to securely affix the connector 71 to the upper portion of the piles 41, 42. This forms a rigid A-frame support structure that is firmly held in the ground.

FIGS. 10, 11 and 13 show various views of another embodiment in accordance with the present invention. In FIGS. 10 and 11, a support 80 for a solar tracker array comprises two piles 41, 42 inserted into the ground at an angle to the vertical, in the same manner as described with reference to FIG. 3. The piles 41, 42 may be identical to the piles 41, 42 is shown in FIG. 3 and need not be described further. They are inserted into the ground in the same manner as described with reference to FIG. 3.

A connector 81 comprises a base plate 82 having a generally U-shaped loop 83 welded thereto. The loop 83 carries a hanger 84A for a solar array torque tube, in a similar manner to that as described with reference to FIGS. 3 and 4. Sleeves 84, 85 are welded to the underside of base plate 82. Sleeves 84, 85 are angled at substantially the same angle as the piles 41, 42 are inserted into the ground. The sleeves 84, 85 have an inner diameter that is substantially the same as or slightly larger than the outer diameter of the piles 41, 42. Gussets 86 are welded to the base plate and the sleeves 84, 85 to strengthen that part of the connector 81. Apertures 87, 88 are formed through sleeves 84, 85.

Once the piles 41, 42 have been inserted into the ground, the connector 81 is positioned so that the sleeves 84, 85 are fitted over the upper portions of the piles 41, 42. The apertures 87, 88 in the sleeves are brought into alignment with apertures formed in the upper portion of the piles 41, 42 and bolts and nuts 89 are used to affix the sleeves 84, 85 to the upper portions of the piles 41, 42. This provides a rigid A-frame support.

FIG. 14 shows a side view of a support frame for mounting the motor used to drive the solar array to follow the sun. The support frame 90 shown in FIG. 14 comprises 4 piles, three of which are shown at 91, 92 and 93, with the fourth pile being hidden behind pile 92. Piles 91, 92 and 93 are inserted into the ground at an angle to the vertical and the upper portions of the piles are located near each other when the piles have been properly mounted into the ground. In order to mount the motor to the piles, a motor mount is connected to the top of the piles.

FIG. 14 shows two different types of motor mount that can be used to form the support frame 90. The first motor mount 94 has a base plate 95 and downwardly depending legs 96 that are similar to the legs 52, 53 shown in the embodiment of FIG. 5. Connecting the motor mount 94 to the piles takes place by similar steps to connecting the connector 46A of FIG. 5 to the piles 41 and 42 of FIG. 3.

Alternatively, motor mount 97 having a base plate 98 and downwardly depending sleeves 99 that are similar to the sleeves 84, 85 of the connector 81 shown in FIG. 10 may be used. Again, connecting the sleeves 99 to the top of the piles 91, 92, 93 is effectively the same as connecting the sleeves 84, 85 to the piles 41, 42 as shown with reference to FIG. 10.

Figure 15:
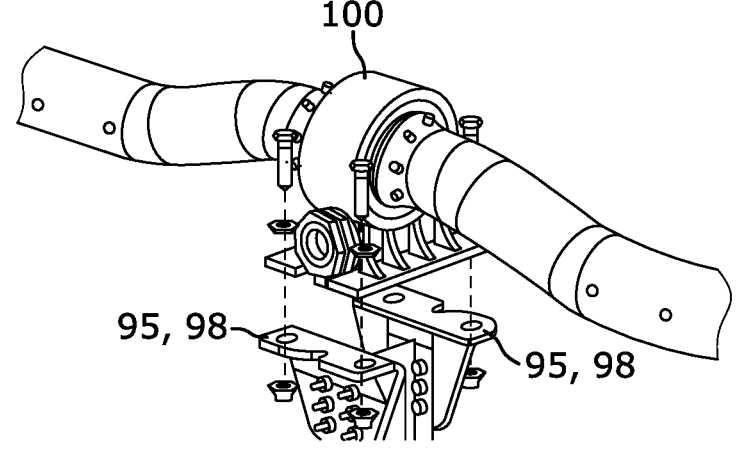
FIG. 15 shows an example of a drive motor being connected to the motor support.

The base plates 95, 98 may provide a four-point slotted bolthole mounting plate, as shown in FIG. 15, to enable the motor 100 to be bolted thereto. FIG. 15 also shows the various nuts, bolts and washers that may be used to bolt the motor 100 to the base plates 95, 98. It will be appreciated from FIG. 15 of the base plates 95, 98 may comprise a plurality of plates connected to each other via one or more intermediate members.

The support system in accordance with the present invention utilises unitary piles that are screwed into the ground at an angle to horizontal. A plurality of A-frame supports are formed. The pile length, plate size and steel thickness are governed by the site specific geotechnical environment and specified loads. Connectors are fitted to the tops of the piles to join the tops of the piles together and to complete the A-frame supports. The connectors will carry a mounting arrangement for mounting or holding a torque tube of a solar array. As unitary piles are used, the steps required to assemble the support system are quite low. Further, inventory control is simplified. In preferred embodiments, tapered legs or chamfered legs on the connector are inserted into the open upper portions of the piles, with the tapering or chamfering of the legs facilitating insertion of legs into the tops of the piles.

Figure 16:
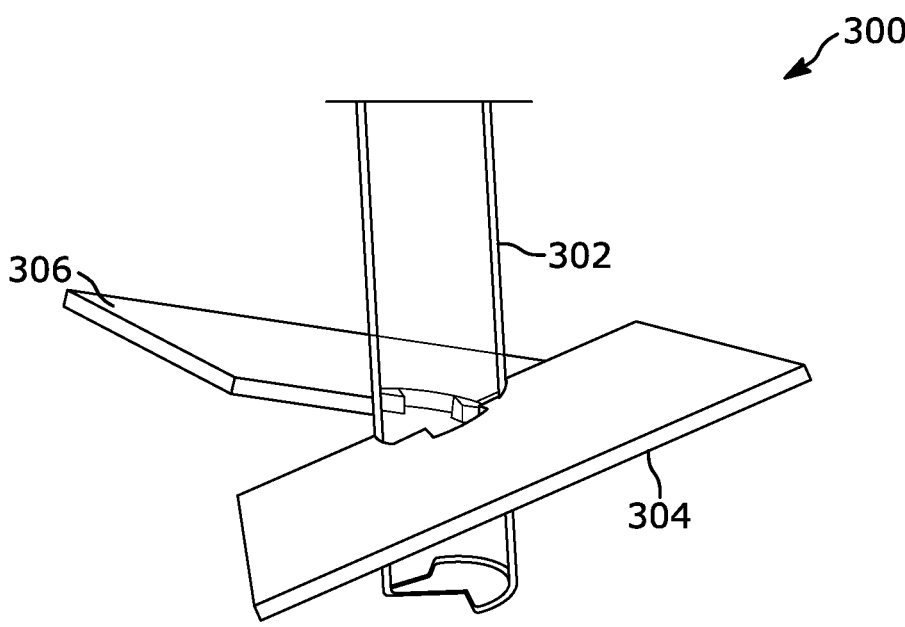
FIG. 16 shows a perspective view of a lower end of a blade pile suitable for use in the present invention, with the shaft of the blade pile shown in shadow so that internal details can be seen.

FIG. 16 shows the lower end of a blade pile 300. The blade pile 300 has a shaft 302 in the form of a hollow cylindrical tube, typically made from mild steel or galvanised steel, although the tube may be made from other materials. The blade pile 300 has two blades 304, 306 affixed thereto, such as by welding. The blades are in the form of plates that are angled relative to each other as shown in FIG. 16. The plates may be made from steel, or a hardened steel, or a hard-faced steel, or having cutting edges that have been hard faced or hardened.

Figure 17:
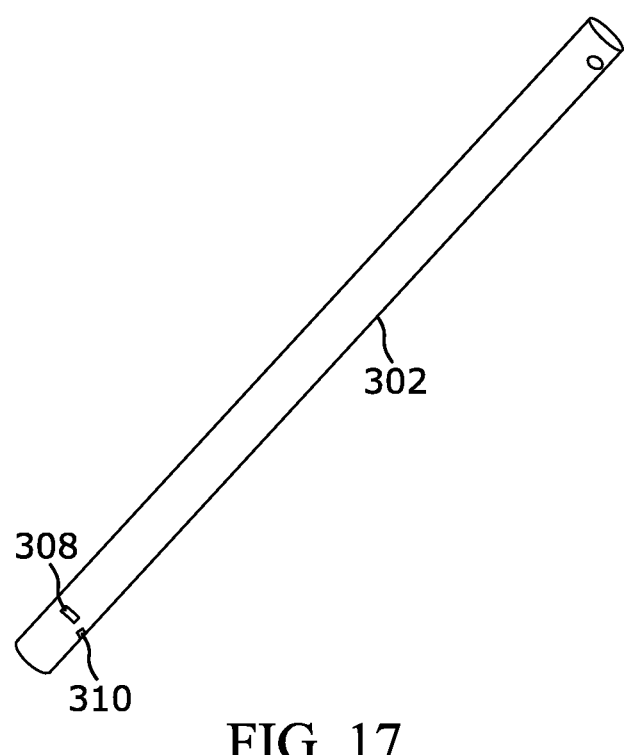
FIG. 17 shows a perspective view of a shaft that can be used in the blade pile shown in FIG. 16.

FIG. 17 shows a perspective view of the shaft 302 used in the blade pile 300. As can be seen, the shaft 302 is a cylindrical hollow tube. A plurality of openings, in the embodiment shown in FIG. 17 being 4 openings, is formed in the lower end of the shaft 302. The openings may be laser cut into the shaft. Two of the openings are shown in FIG. 17 at 308, 310. The openings 308, 310 are used to facilitate mounting of the blades 304, 306 to the shaft 302, as will be described hereunder.

Figure 18:
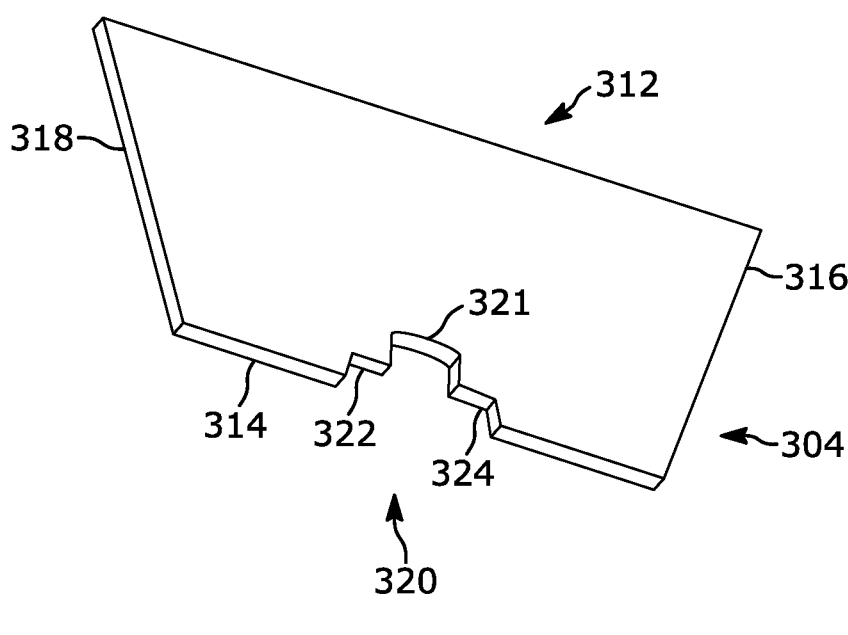
FIG. 18 shows a perspective view of a blade that can be attached to the shaft shown in FIG. 17 to form the blade pile shown in FIG. 16.

FIG. 18 shows blade 304 before it is mounted to the shaft 302. The blade 304 is of general trapezoid shape. The blade 304 has an outer edge 312, an inner edge 314 and side edges 316, 318 (in this context, "inner" and "outer" are used with reference to the position of the blade relative to the shaft in the finished blade pile). The inner edge 314 has a cut-out region 320 having a peripheral region 321 that generally follows the shape of the outer surface of the shaft 302, but with two tabs 322, 224 extending inwardly therefrom. Blade 306 is essentially identical.

Figure 19:
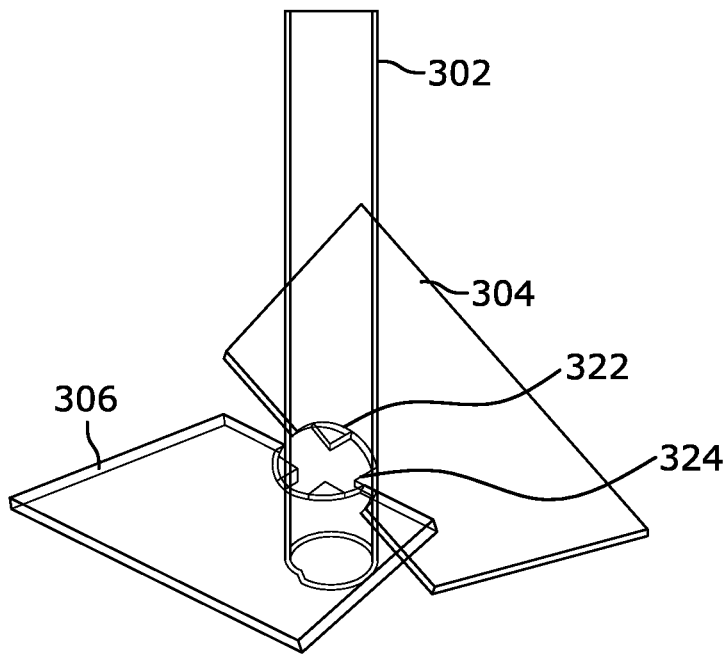
FIG. 19 shows a perspective view from above of the lower end of the blade pile shown in FIG. 16, with the shaft and one of the blades shown in shadow so that internal details can be seen.
Figures 21, 22:
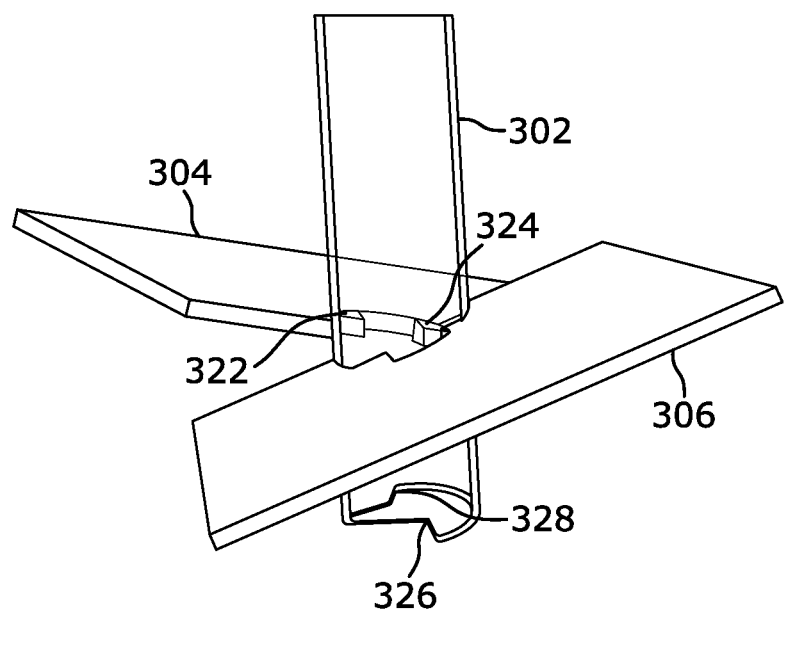
FIG. 21 shows a perspective view from the side of the lower end of the blade pile shown in FIG. 16.
FIG. 22 shows the blade pile of FIG. 16 having a drive tool inserted therein to enable the blade pile to be driven into the ground.

In order to mount the blades 304, 306 to the shaft 302, blade 304 is arranged such that tabs 322, 324 extend into the openings 308, 310 in the lower end of the shaft. The remainder of the peripheral region 321 of the cut at 320 of plate 304 abuts on or is adjacent to the outer surface of the shaft 302. The blade 304 is then welded to the shaft. In the completed blade pile, each blade has two tabs that extend into the internal volume of the shaft 302. This is best shown in FIGS. 19, 20 and 21. In FIG. 20, 322A and 324A are the tabs on blade 306.

As can also be seen in FIG. 21, the lower end of the shaft 302 has sloping shoulders 326, 228. The shoulders act to sweep away soil and stones that have been loosened as the blade pile 300 is driven into the ground.

Figure 23:
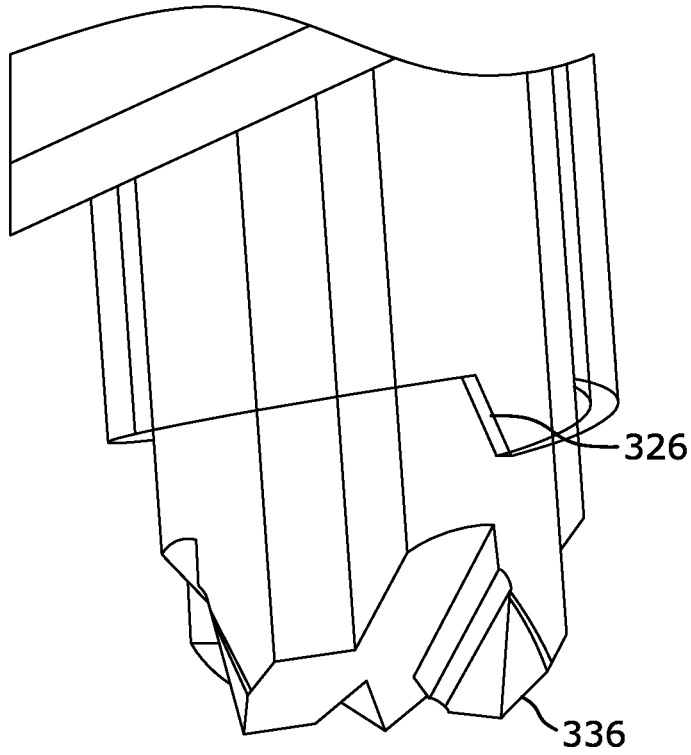
FIG. 23 shows a close-up view of the bottom of the blade pile with the end of the drive tool extending below the bottom of the blade pile.

The tabs 322, 324, 322A, 324A that extend from respective blades 304, 306 into the inner volume of the shaft 302 of the completed blade pile 300 provide a drive region that allows the blade pile 300 to be driven into the ground using an appropriate drive tool that can be inserted into the hollow shaft 302 of the blade pile 300. FIGS. 22 and 23 show the lower region 330 of a drive tool. It will be appreciated that the drive tool 330 includes an elongate shaft that is dimensioned to fit within the hollow shaft 302 of the blade pile. The elongate shaft of the drive tube is not shown in FIGS. 22 and 23, but it will be appreciated that the elongate shaft of the drive tool extends directly above the lower end 330 of the drive tool shown in FIGS. 22 and 23. The shaft of the drive tool may be integrally formed with the lower end of the drive tool (in which case, the lower end of the drive tool may be machined in the drive tool shaft), or the lower end of the drive tool may be affixed to the elongate shaft. The elongate shaft of the drive tool may be a hollow shaft or a solid shaft.

The lower end 330 of the drive tool has four longitudinally extending grooves, two of which are shown at 332, 334, machined or otherwise formed therein. The grooves in the drive tool are shaped to be of complementary shape to the tabs 322, 324, 322A, 324A. As can be seen in FIG. 22, when the drive tool is inserted into the blade pile 300, the grooves 332, 334 receive the tabs 322A, 324A. In order to rotate the blade pile 300, the drive tool is rotated which engages the tabs and this causes the engaged tabs to also rotate which, in turn, causes the blade pile to rotate.

In order to assist in driving the blade pile 300 into the ground, the lowermost end 336 of the drive tool 330 is shaped as an attack bit which can break through rock and soil. As can be seen from FIGS. 22 and 23, the lowermost end 336 of the drive tool extends below and out of the bottom of the blade pile. FIG. 23 also shows shoulder 326 at the lower end of the blade pile 300, which assists in sweeping away disturbed rock and soil as the blade pile 300 is driven into the ground.

Figure 24:
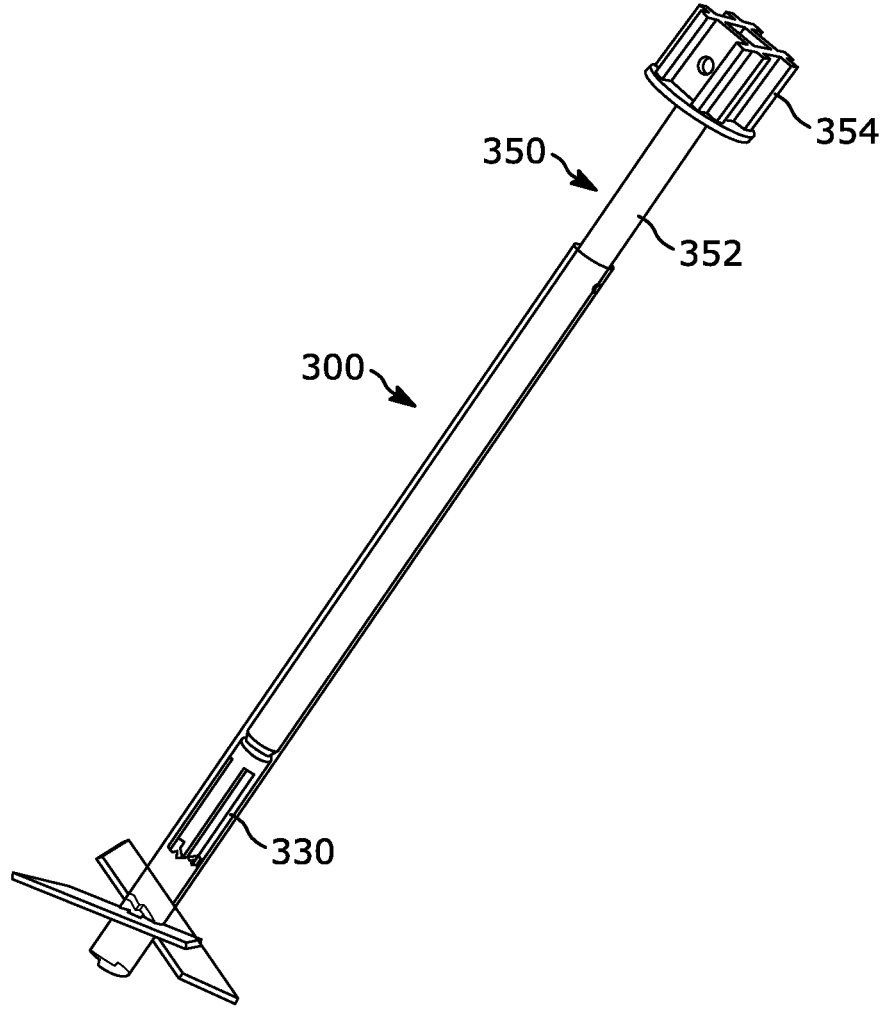
FIG. 24 shows a view of a drive tool being partly inserted into a blade pile

FIG. 24 shows a drive tool 350 having a lower end 330 as shown in FIGS. 22 and 23 partly inserted into the blade pile 330. The shaft 352 of the drive tool 350 can be seen in FIG. 24. A head 354 is attached to the upper end of the drive tool and the head 354 can be fitted into an appropriate tool in a drive head to enable a motor of the drive head to drive/rotate the drive tool.

The arrangement of the blade pile 300 and drive tool 330 allows the blade pile 300 to have the force supplied to it at the blades as it is driven into the ground. This is in contrast to conventional screw piles where the pile is rotated by drive tool that engages with the top part of the pile and the torsional forces are transmitted through the shaft of the pile, which may require use of a heavier shaft to handle the forces associated with driving the pile into the ground.

Figure 25:
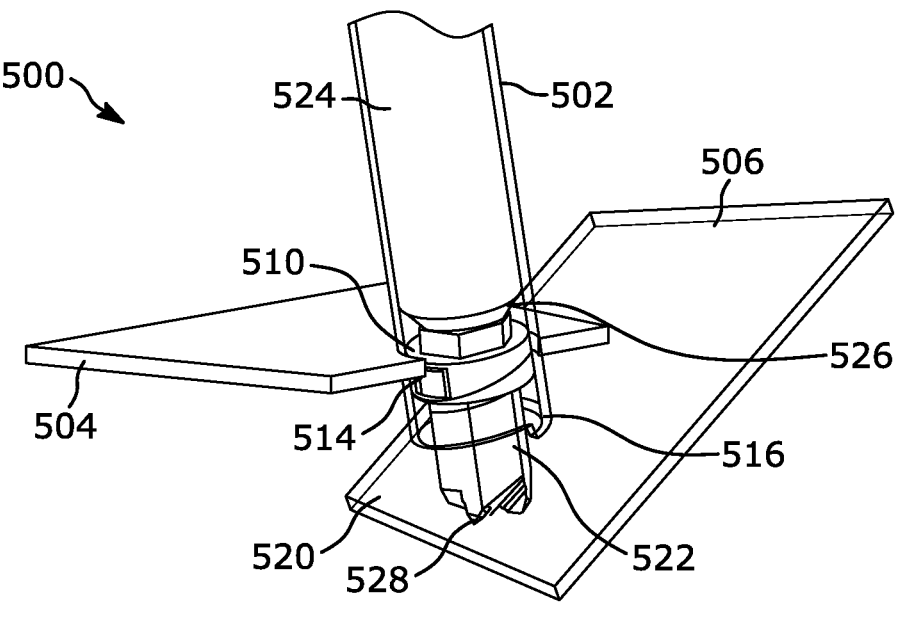
FIG. 25 shows a view of another pile and drive tool suitable for use in the present invention.
Figure 26:
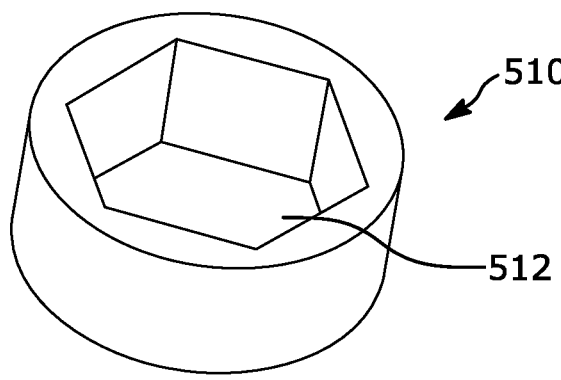
FIG. 26 shows a perspective view of the through-ring welded into the pile shown in FIG. 25.

FIG. 25 shows another pile that is suitable for use in preferred embodiments of the present invention. The pile 500 shown in FIG. 25 has a shaft 502 having two blades 504, 506 affixed thereto, such as by welding. The blades are in the form of plates that are angled relative to each other as shown in FIG. 25. A through-ring 510 having a central opening 512 is positioned inside the shaft 502 at a location that is at, near or adjacent to the blades 504, 506. The opening 512 in the through-ring 510 has a hexagonal shape that can engage with a hexagonal drive tool. A perspective view of the through-ring 510 is shown in FIG. 26. The skilled person will appreciate that the opening 512 may have a number of other shapes that can engage with a complementary-shaped drive tool. The through-ring provides an open socket for engaging with the drive tool. The through-ring 510 is welded to the shaft to permanently affix the through-ring to the shaft. For example, a plurality of openings 514 may be cut or formed into the wall of the shaft and weld metal deposited between the openings and the outer diameter of the through-ring in order to weld the through-ring to the shaft of the pile. In the embodiment shown in FIG. 25, four such openings are provided. Shoulder 516 is formed at the lower end of shaft 502 of the pile 500 to sweep away soil and rocks dislodged by the action of screwing the pile 500 into the ground (a second such shoulder is formed diametrically opposite).

The drive tool 520 comprises a lower region 522 having a hexagonal outer shape. The lower region 522 is sized to fit through the opening 512 in the through-ring 510 and for the lower region 522 to engage with the inner surface of the through-ring 510 whereby rotation of the drive tool 520 causes rotation of the pile 500 to thereby drive the pile into the ground. The drive tool 520 has a shaft 524 extending upwardly from the lower region 522 and the shaft 524 can be fitted with an engagement region at its upper end to enable the drive tool to engage with and be rotatably driven, such as by a motor or an auger drive. The drive tool 500 also has a shoulder 526 located above the lower region 522, with the shoulder 526 acting as a stop member to limit insertion of the drive tool into the pile 500. The lower end 528 of the drive tool 500 is formed as an attack bit to enable it to drill into the ground.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A support for use with a solar tracker, the support including two screw piles or blade piles inserted into the ground at an angle to vertical, wherein top portions of the two screw piles or blade piles are positioned close to each other, and a connector connecting the top portions of the two screw piles or blade piles to each other, the connector carrying or forming a solar tracker support, the connector including a loop of material having a bearing to support a solar tracker, the loop including an inner surface and an outer surface, the connector including a first leg extending from the outer surface of the loop and a second leg extending from the outer surface of the loop, wherein a first pile is screwed into the ground at a first angle to vertical and a second pile is screwed into the ground at a second angle to vertical, with the first pile and the second pile angling inwardly towards a longitudinal axis of the solar tracker, wherein the first leg configured to be received within an upper portion of the first pile and the second leg configured to be received within an upper portion of the second pile, wherein the upper portion of the first pile and the upper portion of the second pile are configured to abut the outer surface of the loop.

2. The support as claimed in claim 1 wherein the first pile includes a first blade pile and the second pile includes a second blade pile, wherein the first blade pile and the second blade pile each include a shaft having one or more openings along an outer surface, wherein the one or more openings are configured to receive an inner edge of a blade.

3. The support as claimed in claim 1 wherein the connector comprises a region positioned between the first leg and the outer surface of the loop, wherein the region includes a diameter being greater than an uppermost diameter of the first leg.

4. The support as claimed in claim 2 wherein the the shaft of each of the first blade pile and the second blade pile includes a hollow shaft configured to receive a drive tool therethrough, the drive tool including one or more grooves configured to receive the inner edge of the blade therein to transfer torque from the drive tool to the shaft.

5. The support as claimed in claim 1 wherein the first leg is crimped or bolted or affixed by fasteners to the first pile and the connector is crimped or bolted or affixed by fasteners to the second pile.

6. The support as claimed in claim 5 wherein the first leg of the connector has a lower region that tapers inwardly or the first leg has an outer part of a lower region removed therefrom, or the first leg has an outer part of a lower region having reduced cross-sectional area at an outer region thereof and the second leg has a lower region that tapers inwardly or the second leg has an outer part of a lower region removed therefrom, or the second leg has an outer part of a lower region having reduced cross-sectional area at an outer region thereof.

7. The support as claimed in claim 6 wherein the first leg and the second leg of the connector have one or more ribs thereon, or the first leg and the second leg have alternating regions of larger diameter or cross-sectional area and smaller diameter or cross-sectional area, with shoulders located therebetween.

8. The support as claimed in claim 1 wherein the connector comprises a solar tracker support, a base portion connected to or formed with the solar tracker support, and two opposed ears or plates extending downwardly from the base portion, a first ear or plate located to one side of a top portion of the first and second piles, a second ear or plate located to another side of a top portion of the first and second piles, and fasteners extending through the first ear or plate and the second ear or plate to affix the top portion of the first pile to the first ear or plate and to the second ear or plate and to affix the top portion of the second pile to the first ear or plate and to the second ear or plate.

9. The support as claimed in claim 1 wherein the connector comprises a solar tracker support, a first sleeve extending downwardly at an angle, a second sleeve extending downwardly at an angle, the first sleeve extending over a top portion of the first pile, the second sleeve extending over a top portion of the second pile, and fasteners for connecting the first sleeve to the first pile and for connecting the second sleeve to the second pile.

10. The support as claimed in claim 9 wherein the solar tracker support comprises a base portion with the first sleeve extending downwardly at an angle from the base portion and the second sleeve extending downwardly at an angle from the base portion.

11. The support as claimed in claim 1 wherein the connector carries a bracket, the bracket adapted to carry a torque tube mounting arrangement.

12. The support as claimed in claim 1 wherein the connector carries or includes a mounting means for a torque tube mounting arrangement, or the connector is adapted to carry a torque tube mounting arrangement.

13. A support system for a solar tracker including a plurality of supports as claimed in claim 1, the supports spaced from each other and extending along the longitudinal axis of the solar tracker.

14. The support system as claimed in claim 13 further comprising a motor support, the motor support including three or four piles inserted into the ground, upper ends of three or four piles adapted to enable a motor drive for the torque tube to be mounted thereto.

15. The support system as claimed in claim 14 wherein three or four piles each extend at an angle to the vertical and extend inwardly towards the longitudinal axis of the solar tracker, the three or four piles also extending inwardly so that their upper portions are located close to each other.

16. The support system as claimed in claim 14 wherein a connector is used to connect the upper ends of the three or four piles to each other.

17. The support system as claimed in claim 16 wherein the connector comprises a plate having three or four legs extending downwardly at an angle to vertical, the three of four legs being adapted for insertion into respective upper proportions of the three or four piles, the legs being crimped or bolted or affixed by other fasteners to the piles.

18. The support system as claimed in claim 17 wherein each leg has a lower region that tapers inwardly or each leg has an outer part of a lower region removed therefrom, or the outer part of the lower region having reduced cross-sectional area at an outer region thereof, or the legs have ribs thereon, or the legs have alternating regions of larger diameter or area and smaller diameter or area, with shoulders located therebetween.

19. The support system as claimed in claim 14 wherein the motor support comprises a base portion, three or four sleeves extending downwardly at an angle to vertical, the sleeves extending over a top portion of respective ones of the three or four piles, and fasteners for connecting the sleeves to the piles.

20. A connector connecting the top portions of a first pile and a second pile to each other, the first and second piles being inserted into the ground at an angle to each other, the connector carrying or forming a solar tracker support, the connector comprising a first leg extending at an angle to vertical, the first leg being received within a top portion of the first pile, and a second leg extending at an angle to vertical, the second leg being received within a top portion of the second pile, the connector including a loop of material having a bearing to support a solar tracker, the loop including an inner surface and an outer surface, the first leg extending from the outer surface of the loop and the second leg extending from the outer surface of the loop, wherein the top portion of the first pile and the top portion of the second pile are configured to abut the outer surface of the loop.

21. The connector as claimed in claim 20 wherein the first leg has a lower region that tapers inwardly or the first leg has an outer part of a lower region removed therefrom or the first leg has an outer part of the lower region having reduced cross-sectional area at an outer region thereof, and the second leg has a lower region that tapers inwardly or the second leg has an outer part of a lower region removed therefrom, or the second leg has an outer part of the lower region having reduced cross-sectional area at an outer region thereof, or the first leg and the second leg have ribs thereon, or the first leg and the second leg have alternating regions of larger diameter or area and smaller diameter or area, with shoulders located therebetween.

22. A connector for connecting the top portions of a first pile and a second pile to each other, the first and second piles being inserted into the ground at an angle to each other, the connector carrying or forming a solar tracker support, the connector comprising a solar tracker support, a base portion connected to or formed with the solar tracker support, and two opposed ears or plates extending downwardly from the base portion, a first ear or plate for locating to one side of a top portion of the first and second piles, and a second ear or plate for locating to another side of a top portion of the first and second piles, wherein a continuous channel is formed between the two opposed ears or plates, wherein the top portion of the first and second piles are both received within the continuous channel.

23. A connector for connecting the top portions of a first pile and a second pile to each other, the first and second piles being inserted into the ground at an angle to each other, a base portion of the connector carrying or forming a solar tracker support, the connector comprising a solar tracker support, a first sleeve extending downwardly at an angle, a second sleeve extending downwardly at an angle, the first sleeve extending over a top portion of the first pile, the second sleeve extending over a top portion of the second pile, the connector including a first gusset extending between the base portion and the first sleeve and a second gusset extending between the base portion and the second sleeve, the first and second gusset positioned laterally outward of the first sleeve and the second sleeve, respectively.

* * * * *